(12) United States Patent
Wang

(10) Patent No.: US 10,229,439 B1
(45) Date of Patent: Mar. 12, 2019

(54) CONTENT SELECTION USING DISTRIBUTION PARAMETER DATA

(71) Applicant: Google LLC, Mountain View, CA (US)

(72) Inventor: Gang Wang, Frederick, MD (US)

(73) Assignee: Google LLC, Mountain View, CA (US)

( * ) Notice: Subject to any disclaimer, the term of this patent is extended or adjusted under 35 U.S.C. 154(b) by 31 days.

(21) Appl. No.: 15/589,207

(22) Filed: May 8, 2017

Related U.S. Application Data

(63) Continuation of application No. 14/169,934, filed on Jan. 31, 2014, now Pat. No. 9,679,314.

(51) Int. Cl.
G06Q 30/02 (2012.01)
G06F 17/30 (2006.01)

(52) U.S. Cl.
CPC ..... G06Q 30/0275 (2013.01); G06F 17/3053 (2013.01); G06F 17/30867 (2013.01); G06Q 30/0251 (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 8,548,981 B1 * | 10/2013 | Bhattacharjee | ..... | G06F 17/3064 707/706 |
| 2003/0220918 A1 * | 11/2003 | Roy | ................. | G06F 17/30864 |
| 2004/0215568 A1 * | 10/2004 | Fukushima | ............ | G06Q 30/02 705/51 |
| 2006/0069614 A1 | 3/2006 | Agarwal | | |
| 2006/0195512 A1 * | 8/2006 | Rogers | .............. | G06F 17/30766 709/203 |
| 2007/0067215 A1 * | 3/2007 | Agarwal | ................ | G06Q 30/02 705/14.69 |
| 2007/0143179 A1 | 6/2007 | Eyal | | |
| 2007/0150345 A1 | 6/2007 | Tonse et al. | | |
| 2007/0156621 A1 | 7/2007 | Wright | | |
| 2007/0162379 A1 | 7/2007 | Skinner | | |
| 2007/0179845 A1 | 8/2007 | Jain | | |
| 2007/0179846 A1 | 8/2007 | Jain et al. | | |
| 2007/0179849 A1 | 8/2007 | Jain | | |
| 2009/0094093 A1 | 4/2009 | Phan | | |
| 2010/0306210 A1 * | 12/2010 | Wang | ..................... | G06Q 30/02 707/759 |
| 2011/0078014 A1 | 3/2011 | Feldman | | |
| 2011/0231241 A1 * | 9/2011 | Kesari | .............. | G06F 17/30699 705/14.42 |
| 2013/0144720 A1 * | 6/2013 | Hari | .................. | G06Q 30/0241 705/14.55 |

* cited by examiner

*Primary Examiner* — Vincent M Cao
(74) *Attorney, Agent, or Firm* — Fish & Richardson P.C.

(57) ABSTRACT

Methods, systems, and apparatus, including computer programs encoded on a computer storage medium, for selecting content items for presentation along with publisher resources. In one aspect, a method includes receiving a request for a content item for presentation at a user device with a publisher resource; receiving, from a content item provider a first selection value for each of a plurality of content items provided by the content item provider; determining, for each of the content items and using accessed distribution parameters, a second selection value distinct from the first selection value; and determining, for each of the content items and independent of a bid corresponding to the content item, a combined selection value based on the first selection value for the content item and the second selection value for the content item.

20 Claims, 4 Drawing Sheets

CONTENT SELECTION USING DISTRIBUTION PARAMETER DATA

CROSS-REFERENCE TO RELATED APPLICATIONS

This application is a continuation application of and claims priority to U.S. application Ser. No. 14/169,934, filed on Jan. 31, 2014, the entire contents of which are hereby incorporated by reference.

BACKGROUND

This specification relates to data processing and content distribution.

The Internet facilitates the exchange of information and transactions between users across the globe. This exchange of information enables content item providers to provide sponsored content to a variety of users. A content item provider can control the distribution of their content items (e.g., promotions, advertisements, audio files, video files, or other content items) based on a set of distribution parameters that specify under what conditions a content item is eligible to be distributed. When a presentation opportunity meeting the conditions is available, the content item is deemed eligible to be provided for presentation.

SUMMARY

In general, one innovative aspect of the subject matter described in this specification can be embodied in methods that include the actions of receiving a request for a content item for presentation at a user device with a publisher resource; indicating, to a content item provider, that the request for a content item has been received; receiving, from the content item provider and in response to the indication that the request for a content item has been received, a first selection value for each of a plurality of content items provided by the content item provider, the first selection value indicating a degree of relevance between the respective content item and the request for a content item; accessing distribution parameters associated with the received request for a content item, the distribution parameters specifying criteria used to distribute content items; determining, for each of the content items and using the accessed distribution parameters, a second selection value distinct from the first selection value, the second selection value indicating a degree of relevance between the respective content item and the request for a content item; determining, for each of the content items and independent of a bid corresponding to the content item, a combined selection value based on the first selection value for the content item and the second selection value for the content item; identifying a particular content item from the plurality of content items having a highest combined selection value from among the combined selection values associated with each of the plurality of content items; and selecting a bid corresponding to the particular content item for submission to a content item selection process that selects, based at least in part on the bid, one or more content items for presentation at the user device with the publisher resource. Other embodiments of this aspect include corresponding systems, apparatus, and computer programs, configured to perform the actions of the methods, encoded on computer storage devices.

These and other embodiments can each optionally include one or more of the following features. Receiving a first selection value can include receiving a weighted value-per-click provided by the content item provider for each content item. Receiving a weighted value-per-click for each content item can include receiving, for each content item, a value that is a combination of a value-per-click that the content item provider has determined for the content item and a content item provider predicted click-through-rate for the content item, the value-per-click for each respective content item being an average value that the respective content item is predicted to generate in response to a user selection of the respective content item. Determining a second selection value can include determining, for each of the content items, an advertising network predicted click-through-rate for the content item based on at least some data that is unavailable to the content item provider. Determining an advertising network predicted click-through-rate can include calculating the advertising network predicted click-through-rate based, at least in part, on one or more distribution parameters associated with the request for the content item and that are not provided to the content item provider. Determining a combined selection value can include determining, for each of the content items, a predicted value-per-impression calculated using the value-per-click value, the content item provider predicted click-through-rate, and the advertising network predicted click-through-rate for each content item. The first selection value can be calculated using a first set of distribution parameters associated with the request for a content item and the second selection value can be calculated using a second set of distribution parameters associated with the request for the content item, where the second set of distribution parameters includes at least one distribution parameter that is different than distribution parameters included in the first set of distribution parameters.

Particular embodiments of the subject matter described in this specification can be implemented so as to realize none, one or more of the following advantages. Merchants can provide advertisements to content consumers that are more tailored to the interests of each content consumer. A content item distribution system can select relevant content items for presentation to content consumers without revealing to content sponsors all information the content item distribution system has regarding the presentation opportunity, a publisher resource being viewed by the content consumer, or a user device displaying the publisher resource.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
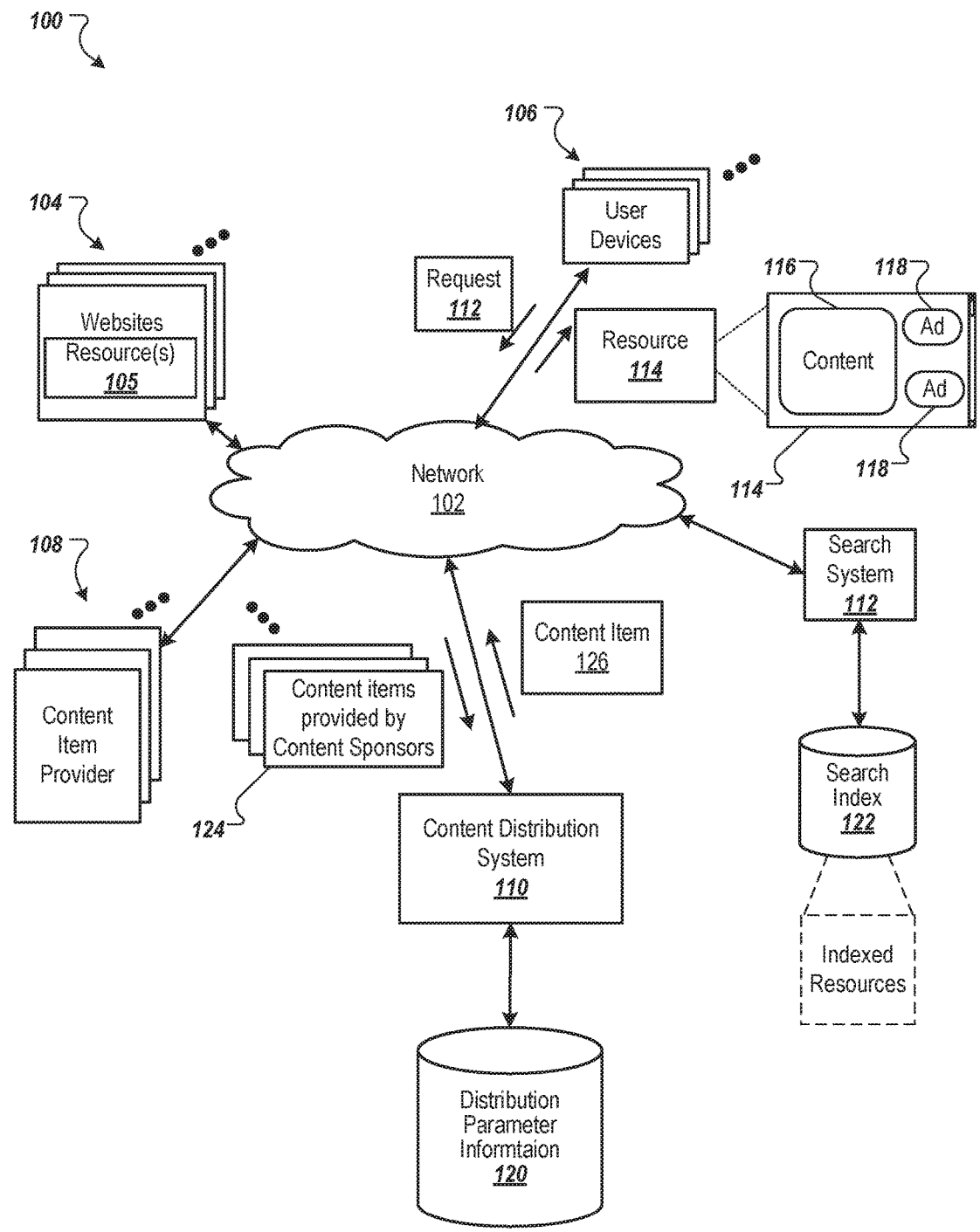
FIG. 1 is a block diagram of an example environment in which content item selection using rich distribution parameter data can be performed.

A content distribution system (e.g., an advertising exchange) that distributes content items (e.g., advertisements) in an online environment may provide to content item providers (e.g., advertisers or advertising networks that distribute content items for advertisers) information that helps the content item providers better identify content to provide in response to a request for content items. For example, a content distribution system can receive a request for content items, such as a request for advertisements that will be displayed with a publisher resource, such as a webpage. The request can include information associated with the publisher resource or a user device that submitted the request. Example information included with the request can include a URL of the publisher resource, keywords (phrases of one or more word) associated with a publisher resource, a title or other text associated with the publisher resource, or a general geographic region associated with the user device (e.g., an Internet Protocol ("IP") address indicating that the user device is located in Florida). Information associated with the publisher resource or user device can be referred to as "selection criteria" since the information can be used to select content items (e.g., advertisements) to distribute for presentation with publisher resources.

The content distribution system can provide some but not all selection criteria associated with a request for content items to a content item provider. For example, the content distribution system can provide a URL and title of a publisher resource associated with the request for content items, but not a device type of a user device that submitted the request. The selection criteria that is provided to the content item provider allows the content item provider to identify one or more content items responsive to the request for content items. Withholding some of the selection criteria helps prevent distribution of data that an administrator of the content distribution system does not want distributed.

In some implementations, the content distribution system can provide instructions to the content item provider requesting that the content item provider provide or indicate more than one content item that is available for distribution in response to a request for content items. For example, in response to receiving a request for an advertisement, the content distribution system can transmit a request for multiple advertisements to one or more advertising networks. The content distribution system can also include some but not all selection criteria associated with the request for advertisements to the advertising networks. In response, each advertising network contacted by the content distribution system can identify multiple advertisements for potential presentation with the publisher resource.

In some implementations, each content item provider can identify content items to provide in response to a request for content using selection criteria received from the content distribution system or from other sources. For example, the content distribution system can request that an advertising network identify five ads that are eligible for presentation in a single advertisement slot along with a webpage. For purposes of illustration, assume that the webpage is an article about new car models. In this example, the content distribution system can provide each advertising network with selection criteria including keywords such as "cars," "luxury vehicles" and "high end automobiles." The advertising network can use the provided selection criteria to identify five different ads (e.g., provided by one or more advertisers) that match the selection criteria. For example, the advertising network can return an advertisement for a first car model, an advertisement for a second car model, an advertisement for a car detailing service, an advertisement for a car dealership, and an advertisement for a car accessories store. In turn, the advertising network can provide information identifying the five different advertisements to the content distribution system.

In some implementations, the content distribution system can use selection criteria not provided to the content item provider to select one content item from the multiple content items provided by the content item provider as the most relevant content item. For example, the content distribution system may have additional information about interests of a user of the user device from which the content item request originated. This additional information is information that the content distribution system did not share with the content item provider. The content distribution system can use the additional information to select, from the multiple content items identified by the content item provider, a content item that may be relevant to users that have the interests specified by the additional information.

For example, the user of a user device from which the request for content items originated can voluntarily enter profile information to allow for presentation of content items (e.g., advertisements) that are more relevant to the user. This information could include, for example, interests of the user, such as hunting and fishing. The content distribution system can use the profile information provided by the user to identify one of the content items that is determined to be most likely relevant to the user based on the information. Following the above example, the content distribution system can identify that the user is interested in vehicle reliability, and identify that the advertisement for the first car model is more appealing to reliability concerned consumers, while the second car model featured in the second advertisement is usually purchased by consumers interested in speed and acceleration. The content distribution system can use this determination to select the advertisement for the first car model as the most relevant content item.

The content distribution system can identify a bid corresponding to the selected content item for use in a content item selection process that selects, based at least in part on the bid, one or more content items for presentation with the publisher resource. For example, the content distribution system can submit a bid corresponding to the selected content item to an auction process that selects from among bids identified by multiple content item providers to identify a highest bid. Following the above example, a bid corresponding to the advertisement for the first car model is submitted to an auction in which the bid competes with bids submitted by other advertisers. If the bid associated with the advertisement for the first car model is selected in the auction process, a network address or other reference to the advertisement for the first car model is provided to the user device to allow the user device to display the advertisement for the first car model for display along with the publisher resource.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

FIG. 1 is a block diagram of an example environment 100 in which content is distributed to user devices 106. The example environment 100 includes a network 102, such as a local area network (LAN), a wide area network (WAN), the Internet, or a combination thereof. The network 102 connects websites 104, user devices 106, content item providers 108, and a content distribution system 110. The example environment 100 may include many different websites 104, user devices 106, and content item providers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as scripts). Units of content that are presented in (or with) resources are referred to as content items, and an individual content item can be stored in a single file or set of files independent of the resource. In some implementations, multiple content items can be stored in a single file.

A user device 106 is an electronic device that is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, web page from a social network, or another resource 105. The data representing the requested resource 114 can include data that cause presentation of resource content 116 at the user device 106. The data representing the requested resource 114 can also include data specifying content item slots 118. A content item slot is a portion of the resource (e.g., a portion of a web page) or a portion of a user display (e.g., a presentation location of another window or in a slot of a web page) in which content items, such as advertisements, can be presented. Content items slots 118 can also be referred to as advertisement slots, but any type of content (e.g., content items other than advertisements) can be presented in these content item slots 118.

To facilitate searching of these resources, the environment 100 can include a search system 112 that identifies the resources by crawling and indexing the resources provided by the publishers on the websites 104. Data about the resources can be indexed based on the resource with which the data are associated. The indexed and, optionally, cached copies of the resources are stored in a search index 122. Data that are associated with a resource is data that represents content included in the resource and/or metadata for the resource.

User devices 106 can submit search queries to the search system 112 over the network 102. In response, the search system 112 accesses the search index 122 to identify resources that are relevant to the search query. The search system 112 identifies the resources in the form of search results and returns the search results to the user device in search results page. A search result is data generated by the search system 112 that identifies a resource that is responsive to a particular search query, and includes a link to the resource. An example search result can include a web page title, a snippet of text or a portion of an image extracted from the web page, and the URL of the web page. Like other resources, search results pages can include one or more content item slots in which content items, such as advertisements, can be presented.

When a resource 105 is requested by a user device 106, execution of code associated with a slot in the resource initiates a request for a content item to populate the slot. When a resource 105 requests a content item, the presentation of the content item is referred to as an impression.

In some implementations, impressions are allocated by a content distribution system 110. For example, some publishers enter into an agreement to have slots on their resources 105 populated by third party content items selected by the content distribution system 110. In some implementations, the publisher can include, in their resource 105, code that when executed by the user device 106, submits a request (i.e., a content item request) to the content distribution system 110.

The request can include characteristics of the slots that are defined for the requested resource 114 as well as selection criteria associated with the requested resource 114. For example, a reference (e.g., URL) to the requested resource 114 for which the slot is defined, a size of the slot, and/or media types that are eligible for presentation in the slot can be provided to the content distribution system 110. Similarly, keywords (phrases of one or more words) associated with a requested resource ("resource keywords") or entities that are referenced by the resource can also be provided to the content distribution system 110 to facilitate identification of content items that are relevant to the requested resource 114. In some implementations, the content distribution system 110 can parse the requested resource 114 to identify keywords based on content of the resource 114. The requests can also include other selection criteria, such as information that the user has provided, geographic information indicating a state or region from which the request was submitted, or other information that provides context for the environment in which the content item will be displayed (e.g., a type of device on which the content item will be displayed, such as a mobile device or tablet device).

The content items that are provided in response to a request (or another content item request) are selected based at least in part on distribution parameters associated with the content items. Distribution parameters are a set of criteria upon which distribution of content items are conditioned. In some implementations, the distribution criteria for a particular content item can include distribution keywords that must be matched (e.g., by resource keywords or search queries) in order for the content item to be eligible for presentation. In some implementations, the content distribution system 110 can access a store of selection criteria 120 to identify distribution parameters associated with a given content item. The distribution criteria can also specify a bid and/or budget for distributing the particular content item. In some implementations, bids can be used in an auction to select which content item(s) will be presented and/or in which slot the content item(s) will be presented. A content item provider can specify a budget, which will limit the maximum amount that the content item provider will spend over a specified period. A content item provider can also specify a maximum amount to pay for a particular impression.

Some content item providers 108 specify different bids for different sets of distribution parameters. For example, assume that a content item provider 108 that distributes a content item related to a college football team from Wisconsin specifies a first set of distribution parameters that includes the distribution keyword "football." Content items distributed based on this first set of distribution parameters will be eligible for presentation when the keyword "football" is matched by data included in a content item request, and the sponsor 108 may be willing to pay a specified price for distribution of content items based on the first set of distribution parameters.

Continuing with this example, the content item provider 108 may also specify a second set of distribution parameters that includes the distribution keyword "football" and also includes an additional distribution parameter, such as a geographic distribution parameter (e.g., Wisconsin). The geographic distribution parameter can require, for example, a content item request to include data referencing a particular geographic location, or one of multiple specified geographic locations, in order for a content item to be marked as eligible to be provided in response to the request. To illustrate, the content item provider 108 in the example above may only want a particular set of content items distributed in response to content item requests that reference Wisconsin, since the college football team is located in Wisconsin. The content item provider 108 may include the additional distribution parameter "Wisconsin" in the second set of distribution parameters. Because the second set of distribution parameters is more restrictive than the first set of distribution parameters, e.g., requiring the content item request to include data matching the keyword "football" and include a reference to Wisconsin, the content item provider 108 may associate a higher bid with the second set of distribution parameters.

The content distribution system 110 uses the specified distribution parameters to distribute content items 124 provided by the content item providers 108 on behalf of the content item providers 108. The content distribution system 110 also stores interaction data specifying, for example and for each impression, whether a user interacted with (e.g., clicked) the content item. For example, when a user clicks on a content item, code included in the content item can initiate a request for a landing page referenced by the content item. Code included in the content item can also cause data representing the interaction to be transmitted to the content distribution system.

In some implementations, when a user device 106 renders the resource 114, code included in the resource 114 is executed that causes the user device 106 to generate one or more requests for content items to fill the content item slots 118. The user device 106 transmits the requests for content items to the content distribution system 110. In some implementations, the requests include keywords and other selection criteria associated with the resource 114 and/or the user device 106 as described above. In response to receiving a request for content items, the content distribution system 110 can request that a content item provider 108 indicate multiple content items 124 for a single content item slot 118. In some implementations, rather than providing the content items at the time of the request, the content item provider 108 can provide multiple content items 124 to the content distribution system 110 that can be stored by the content distribution system 110. At the time of the request, the content item provider 108 can provide content item IDs to the content distribution system 110 for previously provided content items 124 to be considered by the content distribution system 110 for presentation in the single content item slot 118.

The content distribution system 110 can provide selection criteria to the content item provider 108 to allow the content item provider 108 to identify multiple content items 124 for consideration for placement in the single content item slot 118. For example, the content distribution system 110 can identify distribution parameters provided along with the request for a content item and/or distribution parameters retrieved from the store of selection criteria 120 that are associated with the resource 114 and/or the user device 106. The content distribution system 110 can select some but not all of the identified distribution parameters to provide to the content item provider 108. For example, the content distribution system 110 can provide a URL for the resource 114 to the content item provider 108, but not geographic location information for the user device 106.

The content item provider 108 uses the distribution parameters provided by the content distribution system 110 to identify multiple content items 124 for possible presentation in the single content item slot 118. The content distribution system 110 can then use selection criteria not provided to the content item provider 108 to select a single content item from the multiple content items 124 identified by the content item provider 108 as being a relevant content item for the single content item slot 118. For example, the content distribution system 110 can use distribution parameters to assign a selection value to each of the content items 124 provided by the content item provider 108. The content distribution system 110 can then rank the content items 124 according to their assigned selection values and identify a content item of the multiple content items 124 as having the highest selection value.

The content distribution system 110 can submit a bid corresponding to the selected content item having the highest selection value to a content item selection process (e.g., an auction process) to compete against bids associated with content items indicated by other content item providers 108. If the bid corresponding to the content item having the highest selection value is selected in the content item selection process, the content item having the highest selection value is provided to the user device 106 as a content item 126 for presentation along with the resource 114 in the single content item slot 118. In some implementations, providing the content item 126 to the user device 106 includes providing a reference to the content item 106 (e.g., a URL or other network address) to the user device 106 to allow the user device 106 to retrieve the content item 126 for presentation along with the resource 114 in the single content item slot 118.

In some implementations, selection values calculated by each of the content distribution system 110 and the content item provider 108 can be combined to identify a combined selection value for each of the multiple content items 124. For example, the content item provider 108 can select the multiple content items 124 to provide or indicate to the content distribution system 110 by assigning a first selection value to each of a set of content items stored by the content item provider 108. The content item provider 108 can then identify a number of content items having the highest first selection values. For example, the content distribution system 110 can request that the content item provider 108 provide or identify 10 content items for possible presentation in the single content item slot 118. The content item provider 108 can assign first selection values to a set of content items (e.g., using provided selection criteria) and provide the 10 content items having the highest first selection values to the content distribution system 110. The content item provider 108 can also provide an indication of the first selection value for each of the 10 provided content items to the content distribution system 110.

Following this example, the content distribution system 110 can assign a second selection value to each of the 10 content items provided by the content item provider 108. This second selection value can be calculated, for example, using selection criteria not provided to the content item provider 108. In some implementations, the second selection value can be calculated using some selection criteria that has been provided to the content item provider 108 and some selection criteria that has not been provided to the content item provider 108. The content distribution system 110 can then use the first and second selection value for each content item 124 to generate a combined selection value for each content item 124. The content distribution system 110 can rank the content items 124 according to their respective combined selection values, and then select a content item having a highest combined selection value. A bid corresponding to the selected content item can then be submitted to a content item selection process as described above. In some implementations, the content item provider 108 can indicate a different corresponding bid value for each content item 124. In some implementations, the content item provider 108 can specify a single bid value to associate with each of the provided content items 124.

Figure 2:
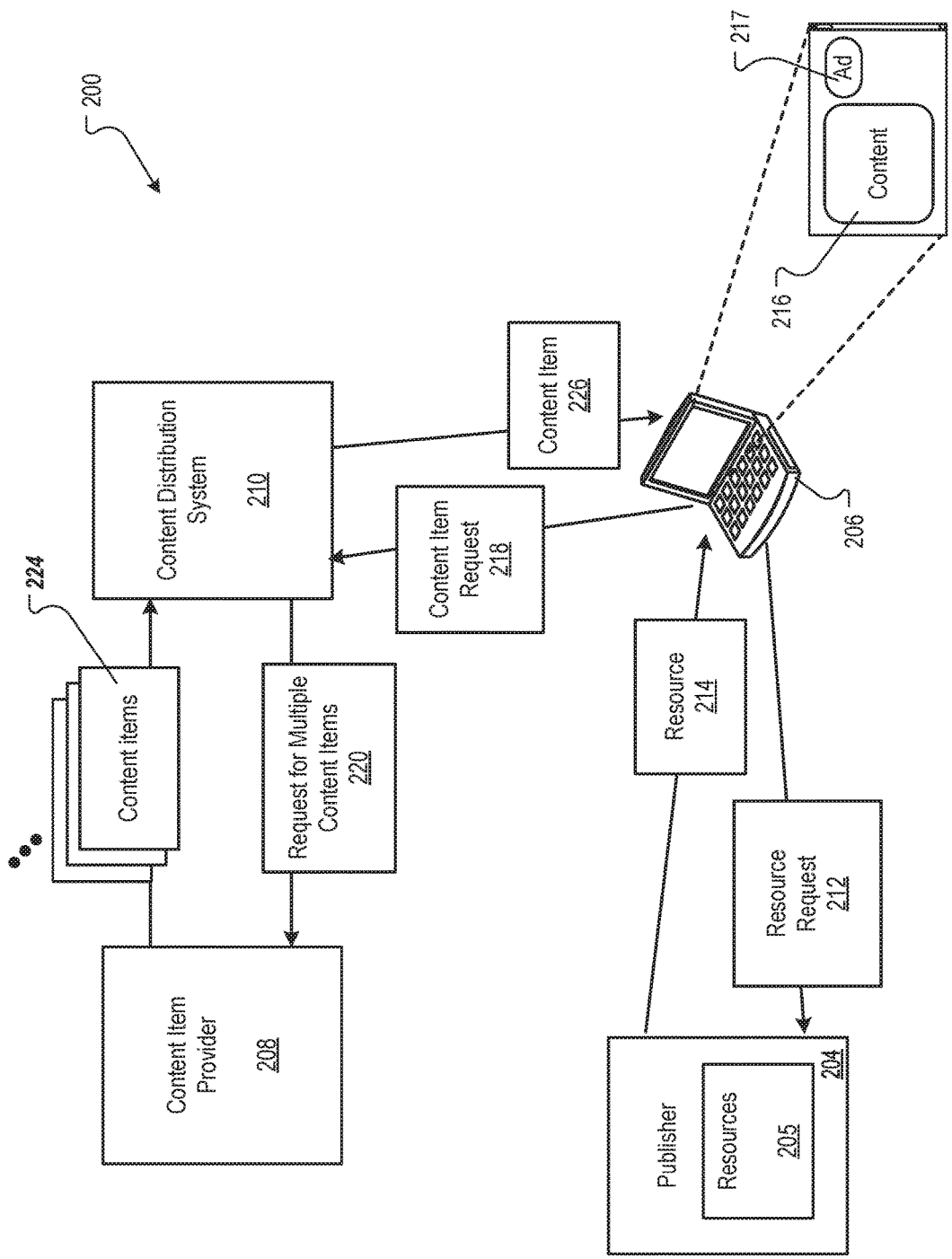
FIG. 2 is a block diagram of an example data flow for selecting content items.

FIG. 2 is a block diagram of an example data flow 200 for selecting content items for presentation with publisher resources. For purposes of example, FIG. 2 is described with reference to user interaction with an advertisement. The data flow 200 is also applicable to user interactions with other types of content items (e.g., audio/video files or content items presented in a social network environment).

The data flow 200 begins with a user device 206 initiating a resource request 212 and transmitting the resource request 212 to a resource publisher 204. For example, a user of the user device 206 can enter a URL for a webpage into a browser running on the user device 206, causing the user device 206 to generate and transmit a request for a webpage from the publisher 204. As another example, the user can select a hyperlink in a webpage displayed by the browser to cause the user device 206 to generate and transmit the resource request 212. In response to receiving the resource request 212, the publisher 204 can access a store of resources 205 to identify a requested resource (e.g., a webpage, video, or other file requested by the user device 206). The publisher 204 can then provide a resource 214 to the user device 206.

The resource 214 can include code segments that, when executed by the user device 206, cause the user device 206 to generate a content item request 218. For example, the user device 206 can render the resource 214 and display resource content 216 in a browser running on the user device 206. The resource 214 can include a code segment indicating a content item slot 217 in which a content item can be displayed along with the resource content 216. In some implementations, execution of one or more code segments included in the resource 214 can cause the user device 206 to include selection criteria in the content item request 218. Selection criteria can include, for example, keywords associated with the resource 214, a URL for the resource 214, a title of the resource content 216, information that the user of the user device 206 has provided, geographic information indicating a state or region that is associated with the content item request 218, or other information that provides context for the environment in which the content item will be displayed (e.g., a type of device on which the content item will be displayed, such as a mobile device or tablet device, display screen dimensions, etc.).

The user device 206 transmits the content item request 218 to a content distribution system 210. The content distribution system 210 can be, for example, an advertisement exchange that distributes content items for multiple different advertisement distribution networks (e.g., distribution systems that distribute content items for multiple different advertisers) and/or multiple different advertisers. The advertisement exchange can, for example, select an advertisement to provide in response to a request for an advertisement based, at least in part, on bids associated with content items that are eligible for presentation in an available advertisement slot.

In response to receiving the content item request 218, the content distribution system 210 can transmit a request for multiple content items 220 to a content item provider 208 (or multiple different content providers). For example, an advertisement exchange can contact one or more advertisement distribution networks and request that each advertisement distribution network identify multiple advertisements for consideration for presentation in an advertisement slot. In response to receiving the request for multiple content items 220, the content item provider 208 can provide data to the content distribution system 210 identifying multiple content items 224. For example, the request for multiple content items 220 can request that the content item provider 208 provide five content items to the content distribution system 210 for consideration for a single content item slot 217. In response, the content item provider 208 can provide to the content distribution system 210 data identifying five content items 224 that the content item provider 208 will provide in response to the content item request 218.

For purposes of example, the data flow 200 is described in the context of the content item provider 208 providing content items 224 to the content distribution system 210 at the time that the content item request 218 is made. However, in some implementations of the data flow 200, at the time the content item request 218 is received by the content distribution system 210, the content distribution system 210 can transmit the request for multiple content items 220 to the content item provider 208 in the form of a request for indications of multiple content items. The content item provider 208 can respond to the request for multiple content items 220 by providing indications of multiple content items. The indication of each of the multiple content items can take the form of a URL, a network address, or a content item identifier (ID). In some implementations, the content distribution system 210 can use the provided indications of multiple content items to retrieve or access the multiple content items. In some implementations, the content distribution system 210 can use the provided indications of multiple content items to access distribution parameters associated with the content items. For example, the content distribution system 210 can access keywords or other information associated with content of the multiple content items.

In some implementations, the request for multiple content items 220 can include selection criteria associated with the content item request 218. For example, keywords, a resource URL, or other selection criteria as described above can be included with the request for multiple content items 220. In some implementations, the content distribution system 210 provides the content item provider 208 with only a subset (e.g., less than all) of the selection criteria for the content item request 218 known to the content distribution system 210. For example, the content distribution system 210 can provide some but not all keywords indicated by the content item request 218 to the content item provider 208. As another example, the content distribution system 210 can provide a URL and title for the resource 214 to the content item provider 208 but not user interest information (e.g., an interest in classic car restoration or Indy Car racing) provided by a user of the user device 206.

In some implementations, the content item provider 208 identifies the multiple content items 224 to provide to the content distribution system 210 by assigning a first selection value to each of a set of content items stored by the content item provider 208. For example, the content item provider 208 can include a computer system for selecting content items to provide to the content distribution system 210 in response to requests for content items received from the content distribution system 210. The computer system can include memory for storing content items and/or information related to the content items (e.g., characteristics of the content items and/or distribution parameters for the content items). The content item provider 208 can calculate a first selection value for each of the stored content items based on selection criteria provided by the content distribution system 210 along with the request for multiple content items 220. For example, as discussed in more detail below, the first selection value can be based on expected performance of a content item when the content item is presented in the context of the provided selection criteria. For example, the first selection value can be a predicted click through rate indicating a prediction of the likelihood that the content item will be selected by a user when the content item is presented in the context of the provided selection criteria. As another example, the first selection value can be a value per impression value that indicates a monetary or other value that is predicted to be generated for each presentation of the content item in accordance with the provided selection criteria. The content item provider 208 can then identify a subset of content items having the highest first selection values and provide the subset of content items (or indications of the subset of content items) to the content distribution system 210 as the content items 224. In some implementations, the content item provider 208 provides the first selection value for each content item 224 to the content distribution system 210.

In some implementations, the content item provider 208 can identify the content items 224 based on a weighted value-per-click (wVPC) that is assigned to each content item in a set of eligible content items that are eligible to be provided in response to the request for multiple content items 220. In some implementations, the content item provider 208 can calculate a wVPC for each content item by combining a value-per-click (VPC) for each content item with a predicted click-through-rate (pCTR) determined for each content item by the content item provider 208. A value-per-click (VPC) can be the value that a content item (e.g., an advertisement) is expected to generate for a content item provider (e.g., an advertiser or advertising network) when the content item is presented to a user and selected by the user (e.g., clicked by the user). Various different content items can have varying VPC values. For example, a VPC for an advertisement for a $10,000 vacation package could be much higher than a VPC for an advertisement for a $10 pair of gloves.

In some implementations, a VPC for each content item in the set of eligible content items is determined based on performance data corresponding to past presentations of a content item. For example, the content item provider 208 can track how often a particular advertisement has been selected (e.g., interacted with) by users as well as the amount of revenue generated (e.g., due to product sales) by selection of the advertisement. The content item provider 208 can then use this information to determine a VPC for the advertisement. In some implementations, the selection criteria provided by the content distribution system 210 can be used to calculate a VPC for a content item.

For example, a particular advertisement might have a first VPC when presented in response to a content item request specifying a first keyword and a second, higher VPC when presented in response to a content item request specifying a second keyword that differs from the first keyword. Assume for purpose of example, that the content item provider 208 determines that selection criteria for the request for multiple content items 220 includes the second keyword. In this example, the content item provider 208 can use this determination to identify the second VPC as the VPC for the particular advertisement.

The content item provider 208 can determine a predicted click-through-rate (pCTR) for a particular content item based, at least in part, on a likelihood that a user will interact with the particular content item when presented in response to a content item request. For example, the content item provider 208 can determine the pCTR for a particular content item based, at least in part, on a historical click-through-rate for the particular content item. In some implementations, a particular content item can be assigned a different pCTR for different requests for content items. For example, a particular content item may have a different historical click-through-rate when presented in response to content item requests specifying different keywords, and the pCTR determined for a particular content item request can be based on the historical click-through-rate of the particular content item in the context of the keyword specified by the particular content item request.

For purposes of illustration, assume that the selection criteria for the request 220 includes the keyword "truck." The content item provider 208 can identify that in previous situations in which a particular advertisement has been provided for presentation in response to a keyword of "truck" users have clicked on the advertisement 345 times out of the 1,000 times that the particular advertisement has been presented. In this example, the content item provider 208 can assign a pCTR of 0.345 to the particular advertisement for requests that include the keyword "truck."

Similarly, if selection criteria associated with a different request for content items includes a keyword of "car," the content item provider 208 can identify that in previous situations in which the advertisement was provided for presentation in response to a keyword of "car" users clicked on the advertisement 180 times out of 1,000 times that the particular advertisement has been presented. In this example, the content item provider 208 can then assign a pCTR of 0.180 to the advertisement for a request for content items that includes the keyword "car." In some implementations, the content item provider 208 calculates a pCTR for a particular content item for each unique combination of distribution parameters associated with a particular request for content items. In some implementations, the pCTR is pre-calculated for each distribution keyword with which the content item is associated, and the pCTR for the distribution keyword that is matched by information included in the content item request is used.

In some implementations, the content item provider 208 can calculate a wVPC for each content item by multiplying a determined VPC and pCTR for each content item. The content item provider 208 can then select a subset of content items having the N highest respective corresponding wVPCs (e.g., where N is an integer) to provide to the content distribution system 210 as the content items 224. The content item provider 208 can also provide the wVPC for each content item to the content distribution system 210. In some implementations, the content item provider 208 can calculate a scaled wVPC for each content item by multiplying the determined VPC and pCTR for each content item and then multiplying the product by a scaling factor. For example, if a scaling factor selected by a content item provider 208 is represented by ẞ, the content item provider 208 can calculate a scaled wVPC for each content item using relationship (1).

$$\text{Scaled wVPC}(i) = \text{wVPC}(i)^* \beta(j) = \text{VPC}(i)^* \text{pCTR}(i,x))^* \beta(j) \quad (1)$$

where,

Scaled wVPC(i) is the scaled weighted value-per-click for content item (i);

wVPC(i) is the weighted value-per-click for content item (i);

$\beta(j)$ is the scaling factor selected by the content provider (j);

VPC(i) is the value-per-click for content item (i); and pCTR(i,x) is the predicted click-through-rate for content item (i) in the context of content item request (x).

In some implementations, the content item provider 208 can use a scaling factor when calculating a scaled wVPCs for each of the content items 224 to avoid providing proprietary wVPC information to the content distribution system 210 while still providing the content distribution system 210 with selection values for the content items 224 that are representative of the proportional differences in wVPC among the content items 224 available from that content item provider. The content distribution system 210 calculates a final selection value for each content item 224 based on the wVPC or scaled wVPC values provided by the content item provider 208. In some implementations, the content distribution system 210 determines a predicted value-per-impression (pVPI) for each content item 224 based on wVPC or scaled wVPC values provided by the content item provider 208 and a pCTR calculated by the content distribution system 210 for each content item 224.

For example, a predicted click-through-rate calculated by the content item provider 208 for a content item can be represented as $\text{pCTR}_{cp}$ and a predicted click-through-rate calculated by the content distribution system 210 for the content item can be represented as $\text{pCTR}_{cd}$. The content item provider 208 can calculate $\text{pCTR}_{cp}$ for the content item using a first set of selection criteria provided by the content distribution system 210 and the content distribution system 210 can calculate $\text{pCTR}_{cd}$ for the content item using a second set of selection criteria that is accessible by the content distribution system 210, and includes at least some information not provided to the content item provider 208. Since the content distribution system 210 and content item provider 208 are calculated using two different sets of selection criteria, each of the content distribution system 210 and content item provider 208 may calculate a different pCTR value for the content item. As described above, the content item provider 208 can calculate a wVPC for a content item based on the $\text{pCTR}_{cp}$ for the content item, and provide the wVPC to the content distribution system 210. The content distribution system 210 can use the content item provider 208 determined wVPC and the $\text{pCTR}_{cd}$ for the content item determined by the content distribution system 210 to calculate a predicted value-per-impression (pVPI) for the content item. The pVPI can be determined, for example, using relationship (2).

$$\text{pVPI}(i) = \text{pCTR}_{cd}(i)^* \text{wVPC}(i) = \text{pCTR}_{cd}(i)^* \text{pCTR}_{cp}(i)^* \text{VPC}(i) \quad (2)$$

where, pVPI(i) is the predicted value-per-impression for content item (i);

$\text{pCTR}_{cd}(i)$ is the predicted click-through-rate determined by the content distribution system for content item (i);

wVPC(i) is the weighted value-per-click for content item (i);

$\text{pCTR}_{cp}(i)$ is the predicted click-through-rate determined by the content item provider for content item (i); and VPC(i) is the value-per-click for content item (i).

Alternatively, the pVPI can be calculated using relationship (3).

$$\text{pVPI}(i) = \text{pCTRcd}(i)^* \text{wVPC}(i) = \text{pCTRcd}(i)^* \text{pCTRcp}(i)^* \text{VPC}(i)^* \beta(j) \quad (3)$$

where, pVPI(i) is the predicted value-per-impression for content item (i);

pCTRcd(i) is the predicted click-through-rate determined by the content distribution system for content item (i);

wVPC(i) is the weighted value-per-click for content item (i);

pCTRcp(i) is the predicted click-through-rate determined by the content item provider for content item (i);

VPC(i) is the value-per-click for content item (i); and $\beta(j)$ is the scaling factor selected by the content provider (j).

The content distribution system 210 can rank the content items 224 provided by (or indicated by) the content item provider 208 according to calculated pVPI for each content item 224 and select the content item having the highest pVPI of the content items 224. The content distribution system 210 can then submit a bid associated with the selected content item having the highest pVPI to a content item selection process as previously described. In some implementations, the content distribution system 210 can provide an indication (e.g., a content item ID) of the content item having the highest pVPI to the content item provider 208.

As mentioned above, the content distribution system 210 can calculate $\text{pCTR}_{cd}$ using selection criteria that are not provided to the content item provider 208. For example, the content item request 218 can be a request for a video to display along with the resource 214. A user of the user device 206 can enter video preference information to indicate that the user prefers humorous videos and does not enjoy serious dramatic videos or horror/scary videos. In some implementations, this video preference information can be entered by the user prior to the content item request 218 being generated and transmitted to the content distribution system 210.

In this example, the content distribution system 210 can send the request for multiple content items 220 to the content item provider 208 along with keywords associated with the resource 214, but not the user entered information indicating video type preferences. In return, the content item provider 208 provides five different videos to the content distribution system 210 along with respective wVPCs. The content distribution system 210 can calculate a $pCTR_{cd}$ for each video using the video preference information provided by the user that was not provided to the content item provider 208.

For example, the videos provided by the content item provider 208 can include a horror video, a comedy video, a serious dramatic video, a sports video, and a music video. The content distribution system 210 can use the user provided video preference information to calculate low respective $pCTR_{cd}$ values for the serious dramatic video and the horror video in comparison to the other videos. The content distribution system 210 can also use the video preference information to calculate a relatively high $pCTR_{cd}$ for the comedy video in comparison to the other videos. The content distribution system 210 can then use the calculated $pCTR_{cd}$ values for each video to determine a pVPI for each video as described above, identify a video having the highest pVPI, and submit a bid corresponding to the video having the highest pVPI to a content item selection process.

In some implementations, the content item provider 208 can select a weighting value to control the weight of $pCTR_{cp}$ calculated by the content item provider 208 versus the weight of $pCTR_{cd}$ calculated by the content distribution system 210 when pVPI is determined. For example, the content item provider 208 can select a weighting value α. The content item provider 208 can calculate wVPC by taking $pCTR_{cp}$ to the (1-α) power. The content item provider 208 provides an indication of the value of α to the content distribution system 210. The content distribution system 210 can calculate pVPI for each content item by raising $pCTR_{cd}$ to the α power and multiplying this value by the wVPC for the content item provided by the content item provider 208. In some implementations, pVPI using a weight value α can be determined using relationship (4).

$$pVPI(i) = pCTRcd(i)^{\alpha} * wVPC(i) = pCTRcd(i)^{\alpha} * pCTRcp(i)^{1-\alpha} * VPC(i) \quad (4)$$

where, pVPI(i) is the predicted value-per-impression for content item (i);

α is the weighting value selected by the content provider;

pCTRcd(i) is the predicted click-through-rate determined by the content distribution system for content item (i);

wVPC(i) is the weighted value-per-click for content item (i);

pCTRcp(i) is the predicted click-through-rate determined by the content item provider for content item (i); and VPC(i) is the value-per-click for content item (i).

Alternatively, the pVPC can be calculated using a scaled wVPC and weight value α using relationship (5).

$$pVPI = pCTR_{cd}^{\alpha} * \text{Scaled wVPC} = pCTR_{cd}^{\alpha} * pCTR_{cp}^{1-\alpha} * VPC * \beta(j) \quad (5)$$

where, pVPI is the predicted value-per-impression for a content item;

α is the weighting value selected by the content provider;

pCTRcd is the predicted click-through-rate determined by the content distribution system for the content item;

wVPC is the weighted value-per-click for the content item;

pCTRcp is the predicted click-through-rate determined by the content item provider for the content item;

VPC(i) is the value-per-click for the content item; and

β(j) is the scaling factor selected by the content provider.

By way of example, the content item provider 208 can select a value for α of 0.5 to give equal weight to the $pCTR_{cp}$ and $pCTR_{cd}$ values. As another example, the content item provider 208 can give higher weight to the content distribution system 210 calculated $pCTR_{cd}$ by assigning a value of 0.8 to α.

In some implementations, the content item provider 208 may lack system resources or information necessary to calculate $pCTR_{cp}$. For example, the content item provider 208 may lack resources to accurately track past click-through-rates for content items in association with different distribution parameters. In some such implementations, the content item provider 208 can assign the same $pCTR_{cp}$ to each content item. For example, the content item provider 208 can select a value of 1 for the $pCTR_{cp}$ for each content item. In some implementations, the content item provider 208 may lack resources or information necessary to calculate VPC for each content item. In some such situations, the content item provider 208 can assign the same VPC to each content item. For example, the content item provider 208 can select a value of 1 for the VPC for each content item. In some implementations, the content item provider 208 can select the same wVPC value for each content item, thus making the calculation of pVPI solely dependent on the $pCTR_{cd}$ for each content item as determined by the content distribution system 210.

In some implementations, the content distribution system 210 can combine selection values determined by the content item provider 208 and the content distribution system 210 for a content item to create a combined selection value using formulas other than those recited above. For example, the content distribution system 210 can determine a combined selection value for a content item by adding a content item provider 208 determined $pCTR_{cp}$ for the content item to a content distribution system 210 determined $pCTR_{cd}$ for the content item.

In some implementations, the content item provider 208 and/or content distribution system 210 can determine selection values for content items using metrics other than those described above. For example, the content item provider 208 (or the content distribution system 210) can calculate a selection value for a content item using a conversions-per-dollar (CPD) value. A CPD value is a calculation of the number of conversions that occur for every dollar spent by the content item provider 208 on providing content items (e.g., money spent on advertisements). A conversion can be an event defined by the content item provider 208. For example, an on-line music retailer can identify each sale of a song or album as a conversion. As another example, a travel reservation website defines a conversion as each time a user makes a hotel reservation using the website. The content item provider 208 can track the amount of money spent on providing a particular content item (e.g., advertisement) and the number of conversions that occur in association with the content item to determine a CPD for the content item.

In some implementations, the content distribution system 210 can filter the content items 224 to eliminate one or more of the content items 224 from consideration for placement in the content item slot 217 prior to identifying a content item having a highest combined weight value (e.g., pVPI). For example, a content item provided by the content item provider 208 may not have the correct dimensions for presentation in the content item slot 217. The content item can be removed from consideration without the content distribution system 210 determining a wVPI for the content item. As another example, a particular content item of the content items 224 can be a video, and the content item request 218 can be a request for a banner advertisement. The particular content item can be eliminated for not being the correct type of content item (a video, not a banner advertisement). As yet another example, the publisher 204 may place restrictions on the content of content items provided for presentation along with resources provided by the publisher 204. For example, the publisher 204 can be a website for children and restrict the content distribution system 210 from providing advertisements for online gambling for presentation along with resources provided by the publisher 204. The content distribution system 210 can identify that the publisher 204 has provided the resource 214 and identify the restriction against online gambling advertisements. The content distribution system 210 can identify one of the content items 224 as an advertisement for online gambling and remove the advertisement from consideration for placement in the content item slot 217.

In some implementations, the content item provider 208 can elect to forego a selection process that includes determining selection values for content items. For example, in response to receiving the request for multiple content items 220, the content item provider 208 can identify and provide a single content item to the content distribution system 210. The content distribution system 210 can then submit a bid corresponding to the provided content item to a content item selection process (e.g., an auction) without calculating selection values for the content item.

In some implementations, prior to transmitting the request for multiple content items 220 to the content item provider 208, the content distribution system 210 can calculate selection values for one or more content items that have previously been provided by the content item provider 208, for example, in response to previous requests for content items for presentation in content item slots. For example, the content distribution system 210 can calculate a $pCTR_{cd}$ value for one or more previously provided content items using selection criteria associated with the resource 214 and/or the user device 206. The content distribution system 210 can then identify a subset of previously provided content items (e.g., 10 content items) having the highest $pCTR_{cd}$ and provide indicators for the identified content items (e.g., content item IDs) to the content item provider 208 along with the request for multiple content items 220 to assist the content item provider 208 in selecting the content items 224 to provide in response to the request for multiple content items 220. In some implementations, the content item provider 208 can use indication of suggested content items received from the content distribution system 210 in selecting the content items 224. In some implementations, the content item provider 208 can use indication of suggested content items received from the content distribution system 210 in calculating selection values for content items. For example, the content item provider 208 can add a predetermined value to the selection value of each content item identified by the content distribution system 210 when calculating selection values for content items. In some implementations, the content item provider 208 can ignore the content item IDs provided by the content distribution system 210 and calculate selection values for content items without taking the indication of content items provided by the content distribution system 210 into consideration.

If a bid corresponding to a content item of the content items 224 is identified as having the highest combined selection value is selected in a bid selection process, an indication of the content item is provided to the user device 206 as content item 226 for presentation in the content item slot 217 alongside the resource content 216. For example, a URL of the content item is provided to the user device 206 for presentation on the user device 206 alongside the resource content 216.

Figure 3:
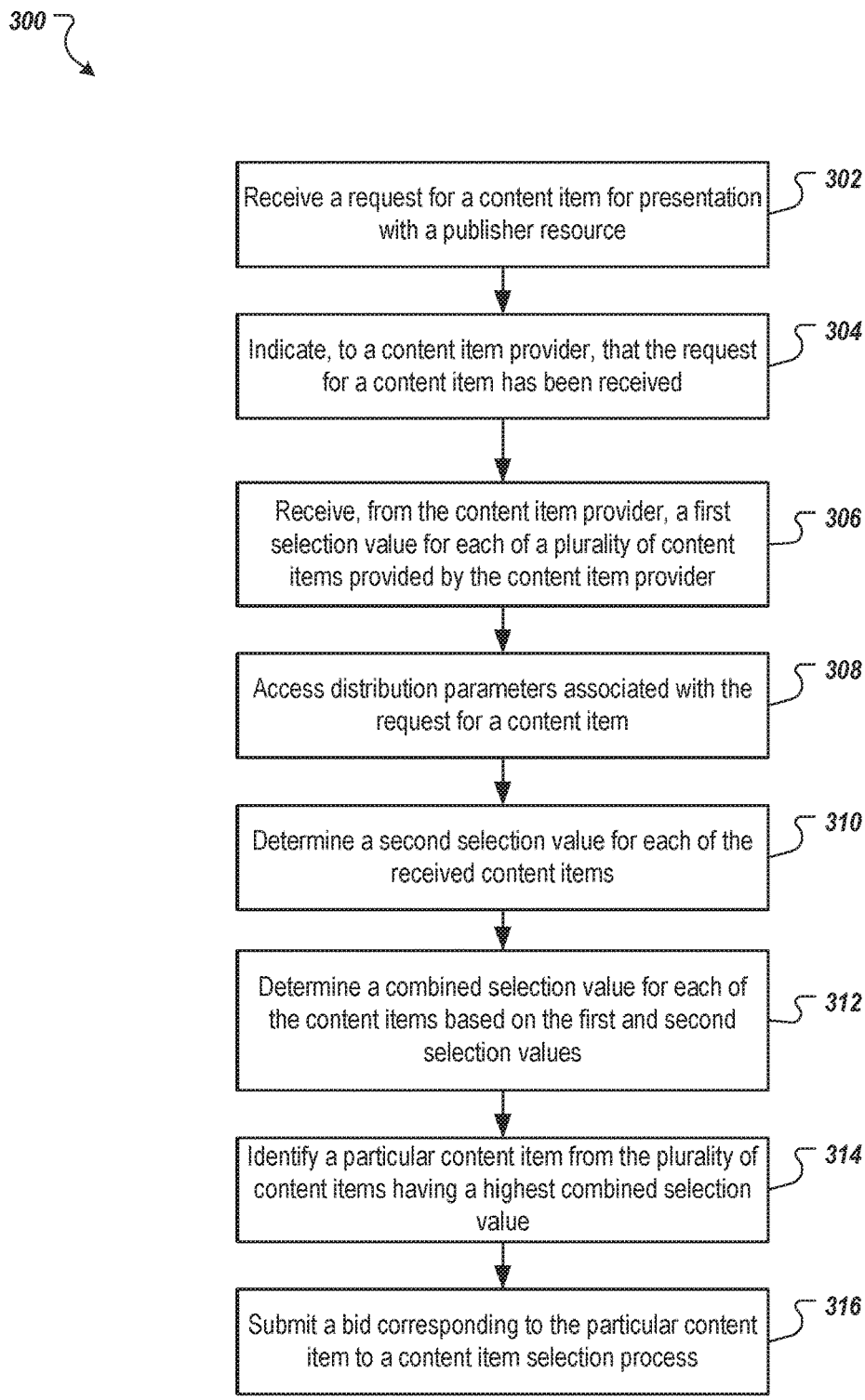
FIG. 3 is a flow chart of an example process for selecting content items.

FIG. 3 is a flow chart of an example process 300 for selecting content items. The process 300 can be performed by one or more data processing apparatus, such as the content distribution system 110, the content distribution system 210, or another data processing apparatus. Operations of the process 300 can be implemented by execution of instructions stored on a non-transitory computer readable medium. Execution of the instructions causes one or more data processing apparatus to perform operations of the process 300.

A request for a content item for presentation with a publisher resource is received (302). In some implementations, the request is received from a user device and specifies selection criteria associated with the publisher resource and/or the user device. For example, the publisher resource can include code segments that are executed by the user device when the publisher resource is rendered by the user device (e.g., using a browser). Execution of the code segments can cause the user device to generate the request and include information associated with the publisher resource such as a URL for the publisher resource, a title of the publisher resource, text included in the publisher resource, or keywords associated with the publisher resource along with the request.

Receipt of the request for a content item is indicated to a content item provider (304). For example, the request for a content item can be received by a content distribution system and the content distribution system can indicate to the content item provider (e.g., an advertising network or advertiser) that the request has been received. In some implementations, the content distribution system can provide the indication to the content item provider in the form of a request for multiple content items. In some implementations, in addition to the indication that the request for a content item has been received, selection criteria are also be provided to the content item provider. In some implementations, selection criteria provided to the content item provider can be a subset of all selection criteria associated with the request for a content item. For example, a content distribution system can identify selection criteria associated with the publisher resource. The content distribution system can elect to only provide the content item provider with some, but not all, of the selection criteria associated with the publisher resource.

A first selection value for each of a plurality of content items provided by the content item provider is received from the content item provider (306). In some implementations, the content item provider provides indicators (e.g., content item IDs) for the content items along with the first selection values in response to receiving the indication that the request for a content item has been received. In some implementations, the content item provider can determine the first selection values for the content items using selection criteria associated with the publisher resource, the request for a content item, or the user device that initiated the request for a content item. For example, the content item provider can calculate a weighted value-per-click (wVPC) by combining a predicted click-through-rate (pCTR) and a value-per-click (VPC) for each content item, and provide the calculated wVPCs corresponding to each of the plurality of content items, as described above with reference to FIG. 2.

Distribution parameters associated with the request for a content item can be accessed (308). In some implementations, the distribution parameters are accessed prior to the receipt of the request for a content item being indicated to the content item provider. Distribution parameters can include a reference (e.g., URL) to the publisher resource, dimensions for a content item slot in which the requested content item is to be presented, media types that are eligible for presentation with the publisher resource, subject matter of content items that are eligible for presentation with the publisher resource, keywords associated with the publisher resource ("resource keywords"), entities that are referenced by the resource, content of the publisher resource (e.g., a title, or text included in the publisher resource), information provided by a user of the user device that initiated the request for a content item (e.g., user interest provided by the user), geographic information indicating a state or region associated with the user device, or other information that provides context for the environment in which the content item will be displayed (e.g., a type of device on which the content item will be displayed, such as a mobile device or tablet device).

A second selection value for each of the received content items is determined (310). In some implementations, the second selection values are determined using some or all of the accessed distribution parameters. For example, a content distribution system can use distribution parameters associated with the request for a content item to calculate a pCTR for each of the content items as described above with reference to FIG. 2. As another example, the content distribution system can calculate a conversion-per-dollar metric for each received content item.

A combined selection value for each of the content items is determined based on the first and second selection values 312. For example, the content distribution system can calculate the combined selection value as a predicted value-per-impression (pVPI) value by multiplying a pCTR calculated by the content distribution system and a wVPC provided by the content item provider for each content item. As another example, the content distribution system can calculate the combined selection value by raising a pCTR calculated by the content distribution system to the $\alpha$ power where a is a weight value provided by the content item provider and then multiplying this value by a wVPC value provided by the content item provider for each content item. As yet another example, the combined selection value can be determined by adding the first selection value for each content item to the second selection value for that content item. As yet another example, the combined selection value can be determined by multiplying the first and second selection values for each content item.

A particular content item of the plurality of content items is identified as having a highest combined selection value (314). For example, the content distribution system can rank the received content items according to their determined combined selection values. The content item having the highest combined selection value is identified.

A bid corresponding to the particular content item is submitted to a content item selection process (316). In some implementations, the bid corresponding to the particular content item is submitted for use in a content item selection auction. In turn, the content item selection auction can select a winning bid from among the bid corresponding to the particular content item and other bids (e.g., corresponding to other content items provided by other content item providers) that were provided to the content item selection auction, and a content item corresponding to a winning bid can be provided in response to the content item request. In some implementations, if the bid corresponding to the particular content item is selected as the winning bid in the content item selection process, an indication of the particular content item is provided in response to the request for a content item. For example, if the bid corresponding to the particular content item is selected in the content item selection process, a network address for the particular content item is provided to a user device that initiated the request for a content item. The user device can then retrieve the particular content item, using the provided network address, for presentation at the user device along with the publisher resource.

Figure 4:
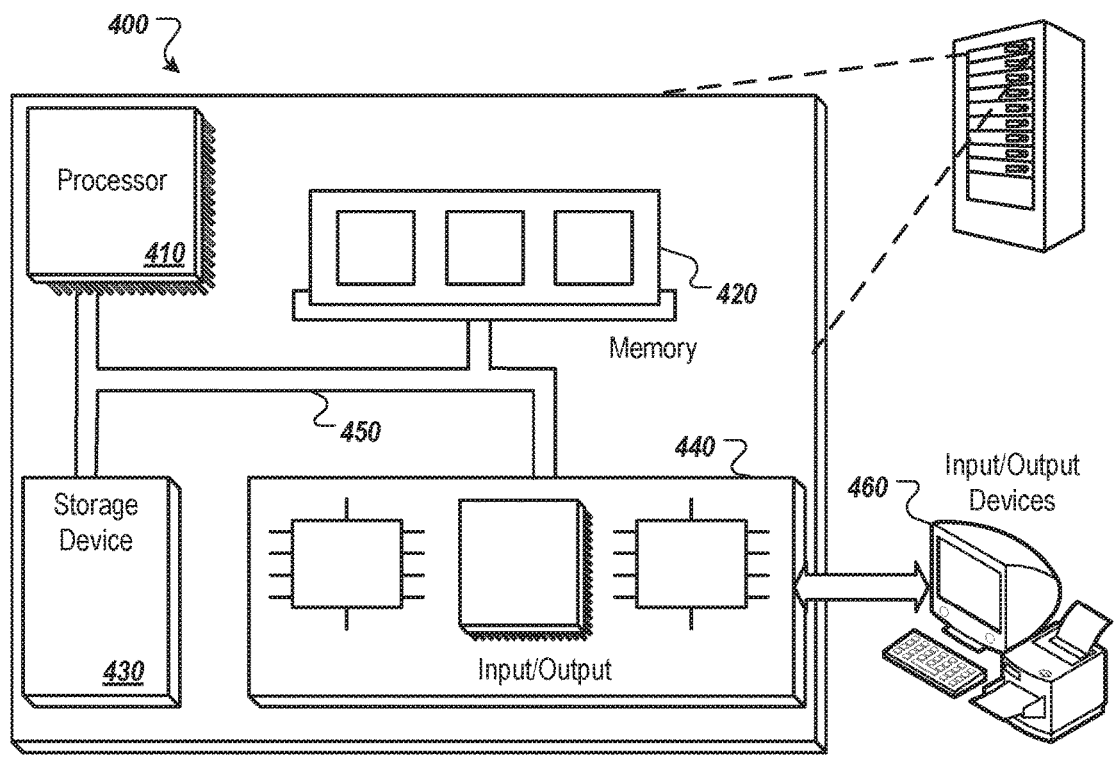
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous

What is claimed is:

1. A computer-implemented method, comprising:
   receiving, from a content item provider, a plurality of content item indicators and an associated first score for each content item;
   accessing information indicative of a context of a content item slot;
   determining, for each of the plurality of content items indicated by the received content item indicators and using the accessed information indicative of the context, a second score distinct from the first score, wherein the second score is determined, at least in part, on information associated with the content item slot that is not provided to the content item provider;
   determining, for each of the plurality of content items and independent of a bid corresponding to the content item, a third score using at least the first score for the content item and the second score for the content item;
   identifying a particular content item from the plurality of content items having a highest third score from among the third scores associated with each of the plurality of content items; and
   in response to identifying the particular content item from the plurality of content items as having the highest third score, submitting the identified particular content item to a content item selection process that selects one or more content items for presentation at the content item slot.

2. The method of claim 1, wherein the first score for each content item is a weighted value-per-click provided by the content item provider for each content item.

3. The method of claim 2, wherein the weighted value-per-click for each content item is a value that is a combination of a value-per-click that the content item provider has determined for the content item and a content item provider predicted click-through-rate for the content item, the value-per-click for each respective content item being an average value that the respective content item is predicted to generate in response to a user selection of the respective content item.

4. The method of claim 3, wherein the second score is an advertising network predicted click-through-rate that is calculated by the advertising network, at least in part, on information associated with the content item slot that is not provided to the content item provider.

5. The method of claim 1, wherein the first score is calculated using a first set of information indicative of a context of the content item slot and the second score is calculated using a second set of information indicative of a context of the content item slot, where the second set information includes at least some data that is different than data included in the first set of information.

6. The method of claim 5, wherein the first set of information includes keywords associated with the content item slot and the second set of information includes information associated with a user of a user device on which a content item is to be presented in the content item slot.

7. The method of claim 5, wherein the second set of information includes selection criteria provided by a user of a user device on which a content item is to be presented in the content item slot, and wherein the selection criteria provided by the user is not provided to the content item provider and is not included in the first set of information.

8. The method of claim 5 further comprising:
   prior to receiving the first score for each of the plurality of content items, providing to the content item provider the first set of information associated with the content item slot without providing the data that is different than data included in the first set of information.

9. The method of claim 1 further comprising:
   prior to identifying the particular content item from the plurality of content items as having the highest third score, filtering the plurality of content items to remove one or more content items from the plurality of content items based on one or more filtering criteria;
   wherein identifying the particular content item from the plurality of content items as having the highest third score is performed on the filtered plurality of content items after the one or more content items has been removed from the plurality of content items.

10. A computer storage medium encoded with a computer program, the program comprising instructions that when executed by one or more data processing apparatus cause the one or more data processing apparatus to perform operations comprising:
    receiving, from a content item provider, a plurality of content item indicators and an associated first score for each content item;

accessing information indicative of a context of a content item slot;

determining, for each of the plurality of content items indicated by the received content item indicators and using the accessed information indicative of the context, a second score distinct from the first score, wherein the second score is determined, at least in part, on information associated with the content item slot that is not provided to the content item provider;

determining, for each of the plurality of content items and independent of a bid corresponding to the content item, a third score using at least the first score for the content item and the second score for the content item;

identifying a particular content item from the plurality of content items having a highest third score from among the third scores associated with each of the plurality of content items; and in response to identifying the particular content item from the plurality of content items as having the highest third score, submitting the identified particular content item to a content item selection process that selects one or more content items for presentation at the content item slot.

11. The computer storage medium of claim 10, wherein the first score for each content item is a weighted value-per-click provided by the content item provider for each content item.

12. The computer storage medium of claim 11, wherein the weighted value-per-click for each content item is a value that is a combination of a value-per-click that the content item provider has determined for the content item and a content item provider predicted click-through-rate for the content item, the value-per-click for each respective content item being an average value that the respective content item is predicted to generate in response to a user selection of the respective content item.

13. The computer storage medium of claim 12, wherein the second score is an advertising network predicted click-through-rate that is calculated by the advertising network, at least in part, on information associated with the content item slot that is not provided to the content item provider.

14. The computer storage medium of claim 10, wherein the first score is calculated using a first set of information indicative of a context of the content item slot and the second score is calculated using a second set of information indicative of a context of the content item slot, where the second set information includes at least some data that is different than data included in the first set of information.

15. The computer storage medium of claim 14, wherein the first set of information includes keywords associated with the content item slot and the second set of information includes information associated with a user of a user device on which a content item is to be presented in the content item slot.

16. The computer storage medium of claim 14, wherein the second set of information includes selection criteria provided by a user of a user device on which a content item is to be presented in the content item slot, and wherein the selection criteria provided by the user is not provided to the content item provider and is not included in the first set of information.

17. The computer storage medium of claim 14, the operations further comprising:

prior to receiving the first score for each of the plurality of content items, providing to the content item provider the first set of information associated with the content item slot without providing the data that is different than data included in the first set of information.

18. The computer storage medium of claim 10, the operations further comprising:

prior to identifying the particular content item from the plurality of content items as having the highest third score, filtering the plurality of content items to remove one or more content items from the plurality of content items based on one or more filtering criteria;

wherein identifying the particular content item from the plurality of content items as having the highest third score is performed on the filtered plurality of content items after the one or more content items has been removed from the plurality of content items.

19. A system comprising:

a data store storing distribution parameters; and one or more computers that interact with the data store and execute instructions that cause the one or more computers to perform operations comprising:

receiving, from a content item provider, a plurality of content item indicators and an associated first score for each content item;

accessing information indicative of a context of a content item slot;

determining, for each of the plurality of content items indicated by the received content item indicators and using the accessed information indicative of the context, a second score distinct from the first score, wherein the second score is determined, at least in part, on information associated with the content item slot that is not provided to the content item provider;

determining, for each of the plurality of content items and independent of a bid corresponding to the content item, a third score using at least the first score for the content item and the second score for the content item;

identifying a particular content item from the plurality of content items having a highest third score from among the third scores associated with each of the plurality of content items; and in response to identifying the particular content item from the plurality of content items as having the highest third score, submitting the identified particular content item to a content item selection process that selects one or more content items for presentation at the content item slot.

20. The system of claim 19, wherein the first score is calculated using a first set of information indicative of a context of the content item slot and the second score is calculated using a second set of information indicative of a context of the content item slot, where the second set information includes at least some data that is different than data included in the first set of information; wherein the first set of information includes keywords associated with the content item slot and the second set of information includes information associated with a user of a user device on which a content item is to be presented in the content item slot.

* * * * *

UNITED STATES PATENT AND TRADEMARK OFFICE
CERTIFICATE OF CORRECTION

| | | |
|---|---|---|
| PATENT NO. | : 10,229,439 B1 | Page 1 of 1 |
| APPLICATION NO. | : 15/589207 | |
| DATED | : March 12, 2019 | |
| INVENTOR(S) | : Wang | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 112 days.

Signed and Sealed this
Tenth Day of December, 2019

Andrei Iancu
*Director of the United States Patent and Trademark Office*